(12) United States Patent
Steward et al.

(10) Patent No.: US 11,357,223 B2
(45) Date of Patent: Jun. 14, 2022

(54) HOOF CARE KITS AND METHODS OF MAKING AND USING THE SAME

(71) Applicant: EASTERN TECHNOLOGIES, INC., Ashford, AL (US)

(72) Inventors: John Brian Steward, Sedona, AZ (US); Tanner Eldon Bryson, Camp Verde, AZ (US)

(73) Assignee: EASTERN TECHNOLOGIES, INC., Ashford, AL (US)

( * ) Notice: Subject to any disclaimer, the term of this patent is extended or adjusted under 35 U.S.C. 154(b) by 265 days.

(21) Appl. No.: 16/207,664

(22) Filed: Dec. 3, 2018

(65) Prior Publication Data

US 2019/0166819 A1 Jun. 6, 2019

Related U.S. Application Data

(60) Provisional application No. 62/594,220, filed on Dec. 4, 2017.

(51) Int. Cl.
| | |
|---|---|
| *A01L 15/00* | (2006.01) |
| *A61D 9/00* | (2006.01) |
| *B32B 7/14* | (2006.01) |
| *B32B 3/26* | (2006.01) |
| *B32B 37/12* | (2006.01) |
| *B32B 37/18* | (2006.01) |
| *A61D 7/00* | (2006.01) |
| *B32B 5/02* | (2006.01) |

(52) U.S. Cl.
CPC .............. *A01L 15/00* (2013.01); *A61D 7/00* (2013.01); *A61D 9/00* (2013.01); *B32B 3/266* (2013.01); *B32B 5/02* (2013.01); *B32B 7/14* (2013.01); *B32B 37/12* (2013.01); *B32B 37/18* (2013.01); *B32B 2535/00* (2013.01)

(58) Field of Classification Search
CPC ... A01L 15/00; A01L 3/00; A01L 7/02; A61D 7/00; A61D 9/00; B32B 2535/00; B32B 3/266; B32B 5/02; B32B 7/14; B32B 37/12; B32B 37/18
See application file for complete search history.

(56) References Cited

U.S. PATENT DOCUMENTS

| | | | | |
|---|---|---|---|---|
| 594,080 | A * | 11/1897 | Hennessey | A01L 7/02 168/28 |
| 1,212,266 | A * | 1/1917 | Schrader et al. | A01L 5/00 168/4 |
| 1,442,748 | A * | 1/1923 | Trauger | A01L 1/04 168/28 |
| 3,302,723 | A | 2/1967 | Renkenberger et al. | |
| 3,508,544 | A * | 4/1970 | Moore | A61F 13/069 128/892 |
| 4,183,156 | A * | 1/1980 | Rudy | A43B 17/035 36/29 |

(Continued)

FOREIGN PATENT DOCUMENTS

GB 2495956 A * 5/2013 ........... A61F 15/008

OTHER PUBLICATIONS

PCT/US2018/063568 International Search Report and Written Opinion dated Mar. 3, 2019.

*Primary Examiner* — Son T Nguyen
(74) *Attorney, Agent, or Firm* — Withers & Keys, LLC

(57) ABSTRACT

Hoof care kits suitable for treating an animal's hoof are disclosed. Methods of making and using hoof care kits are also disclosed.

20 Claims, 12 Drawing Sheets

(56) References Cited

U.S. PATENT DOCUMENTS

| | | | | |
|---|---|---|---|---|
| 4,444,269 A | * | 4/1984 | Laurent | A01K 13/007 168/1 |
| 5,209,048 A | * | 5/1993 | Hanson | A01K 13/007 168/2 |
| 5,842,523 A | * | 12/1998 | Stuebbe | A01L 5/00 168/4 |
| 6,062,008 A | | 6/2000 | Nor | |
| 6,122,901 A | * | 9/2000 | Schultz | A61D 9/00 168/27 |
| 9,149,021 B2 | * | 10/2015 | Kerler | A01K 29/00 |
| 2006/0041211 A1 | * | 2/2006 | Hawkinson | A61L 15/26 602/41 |
| 2007/0039289 A1 | * | 2/2007 | LeCompte | A01L 7/00 54/82 |
| 2007/0068125 A1 | | 3/2007 | Ford | |
| 2008/0156503 A1 | * | 7/2008 | McSherry | A01K 13/007 168/2 |
| 2009/0149793 A1 | * | 6/2009 | Tilghman | A61D 9/00 602/54 |
| 2010/0114155 A1 | * | 5/2010 | Siani | A01L 15/00 606/212 |
| 2010/0179388 A1 | * | 7/2010 | Ovnicek | A61D 9/00 600/300 |
| 2012/0310186 A1 | * | 12/2012 | Moghe | A61L 15/46 604/304 |
| 2013/0129056 A1 | * | 5/2013 | Ovnicek | A61B 6/04 378/208 |
| 2014/0231100 A1 | | 8/2014 | Davis | |
| 2017/0172134 A1 | * | 6/2017 | Ruetenik | A01K 13/007 |
| 2017/0360542 A1 | * | 12/2017 | Brasch | A61L 15/28 |

* cited by examiner

HOOF CARE KITS AND METHODS OF MAKING AND USING THE SAME

CROSS-REFERENCE TO RELATED APPLICATIONS

This patent application claims the benefit of priority to U.S. Provisional Patent Application Ser. No. 62/594,220 filed on Dec. 4, 2017 and entitled "HOOF CARE KITS AND METHODS OF MAKING AND USING THE SAME," the subject matter of which is hereby incorporated by reference in its entirety.

FIELD OF THE INVENTION

The present invention is directed to hoof care kits for treatment of an animal's hoof. The present invention is further directed to methods of making and using hoof care kits to treat an animal's hoof.

BACKGROUND

Efforts continue to further develop products that provide a better quality of life for animals such as horses and livestock.

SUMMARY

The present invention addresses some of the difficulties and problems in the art by the discovery of new hoof care kits for treatment of an animal's hoof.

Accordingly, the present invention is directed to hoof care kits for treatment of an animal's hoof. In one exemplary embodiment, the hoof care kit of the present invention comprises: a hoof care pad, said hoof care pad comprising: a backing layer comprising a central backing layer portion, three or more backing layer extension portions extending outward from said central backing layer portion, an upper backing layer surface along said central backing layer portion and said three or more backing layer extension portions, and a lower backing layer surface opposite said upper backing layer surface; an adhesive positioned along at least a portion of said upper backing layer surface; and a void-containing layer positioned on at least a portion of said upper backing layer surface within said central backing layer portion, said void-containing layer being capable of accepting and containing a liquid composition, wherein said hoof care pad is sized so as to cover a bottom surface of a hoof of an animal and extend along at least one side surface of the hoof. The hoof care kit may include other kit components including, but not limited to, one or more release liners to cover any exposable surfaces of adhesive along the backing layer; a length of tubing; a boot; one or more pieces of packaging; or any combination thereof.

The present invention even further relates to methods of making hoof care kits. In one exemplary embodiment, the method of making a hoof care kit comprises: forming a backing layer for a hoof care pad, the backing layer comprising a central backing layer portion, three or more backing layer extension portions extending outward from the central backing layer portion, an upper backing layer surface along the central backing layer portion and the three or more backing layer extension portions, and a lower backing layer surface opposite the upper backing layer surface; forming a void-containing layer for a hoof care pad, the void-containing layer being (i) positionable on at least a portion of the upper backing layer surface within the central backing layer portion, and (ii) capable of accepting and containing a liquid composition; and positioning an adhesive along at least a portion of the upper backing layer surface; wherein the hoof care pad is sized so as to cover a bottom surface of a hoof of an animal and extend along at least one side surface of the hoof.

The present invention even further relates to methods of using hoof care kits. In one exemplary embodiment, the method of using a hoof care kit comprises positioning a hoof care pad along a hoof of an animal with a void-containing layer of the hoof care pad next to the hoof, the hoof care pad comprising: a backing layer comprising a central backing layer portion, three or more backing layer extension portions extending outward from the central backing layer portion, an upper backing layer surface along the central backing layer portion and the three or more backing layer extension portions, and a lower backing layer surface opposite the upper backing layer surface; an adhesive positioned along at least a portion of the upper backing layer surface; and the void-containing layer positioned on at least a portion of the upper backing layer surface within the central backing layer portion, the void-containing layer being capable of accepting and containing a liquid composition, wherein the hoof care pad is sized so as to cover a bottom surface of a hoof of an animal and extend along at least one side surface of the hoof. The method of using the hoof care kit may further comprise one or more additional steps including, but not limited to, attaching distal end extension portions of each of the three or more backing layer extension portions to side surfaces of the hoof removing one or more pieces of release liner to uncover one or more exposed surfaces of the adhesive prior to said attaching step; fixing a first end of a length of tubing to the hoof care pad proximate or along the void-containing layer of the hoof care pad; positioning a boot over the hoof and lower leg of the animal so as to encapsulate the hoof care pad attached to the hoof of the animal; and introducing a liquid composition into or onto the void-containing layer of the hoof care pad, wherein the liquid composition comprises one or more medications for treating a hoof of an animal of a wound proximate or on the hoof of an animal.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION

Figure 1:
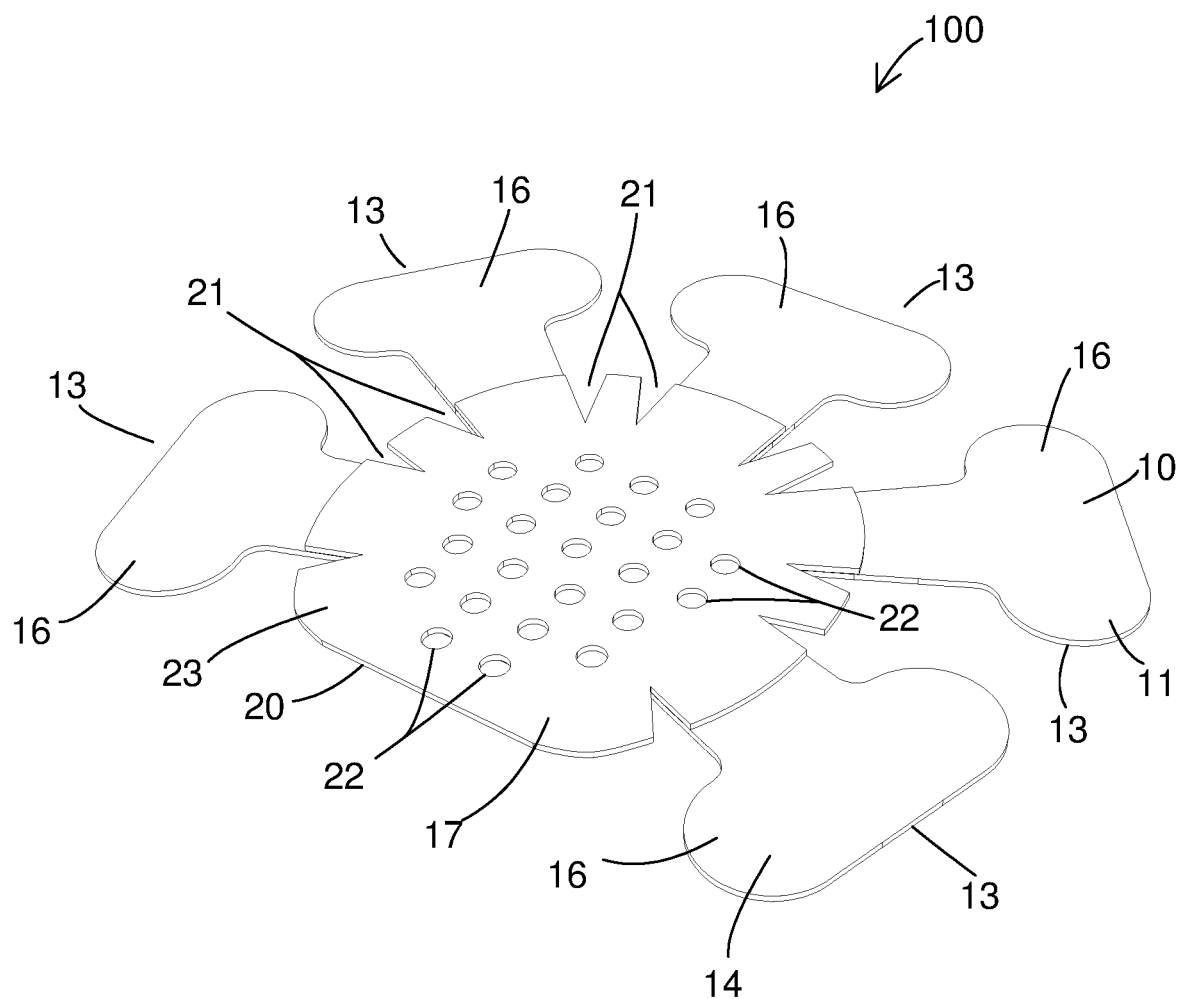
FIG. 1 is a perspective view of an exemplary hoof care pad suitable for use in the hoof care kits of the present invention as viewed from a top, front right-hand side of the hoof care pad.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to hoof care kits that are suitable for treating the hoof of an animal. The present invention is further directed to methods of making hoof care kits. The present invention is even further directed to methods of using hoof care kits.

The hoof care kits of the present invention are further described in the following embodiments.

Other Embodiments

Hoof Care Kits

Embodiment 1. A hoof care kit 100 comprising: a hoof care pad 10, said hoof care pad 10 comprising: a backing layer 11 comprising a central backing layer portion 12, three or more backing layer extension portions 13 extending outward from said central backing layer portion 12, an upper backing layer surface 14 along said central backing layer portion 12 and said three or more backing layer extension portions 13, and a lower backing layer surface 15 opposite said upper backing layer surface 14; an adhesive 16 positioned along at least a portion of said upper backing layer surface 14; and a void-containing layer 17 positioned on at least a portion of said upper backing layer surface 14 within said central backing layer portion 12, said void-containing layer 17 being capable of accepting and containing a liquid composition (not shown), wherein said hoof care pad 10 is sized so as to cover a bottom surface of a hoof of an animal (not shown) and extend along at least one side surface of the hoof.

Embodiment 2. The hoof care kit 100 of embodiment 1, wherein said void-containing layer 17 has an overall size and shape so as to extend beyond an outer periphery 18 of said central backing layer portion 12.

Figure 2:
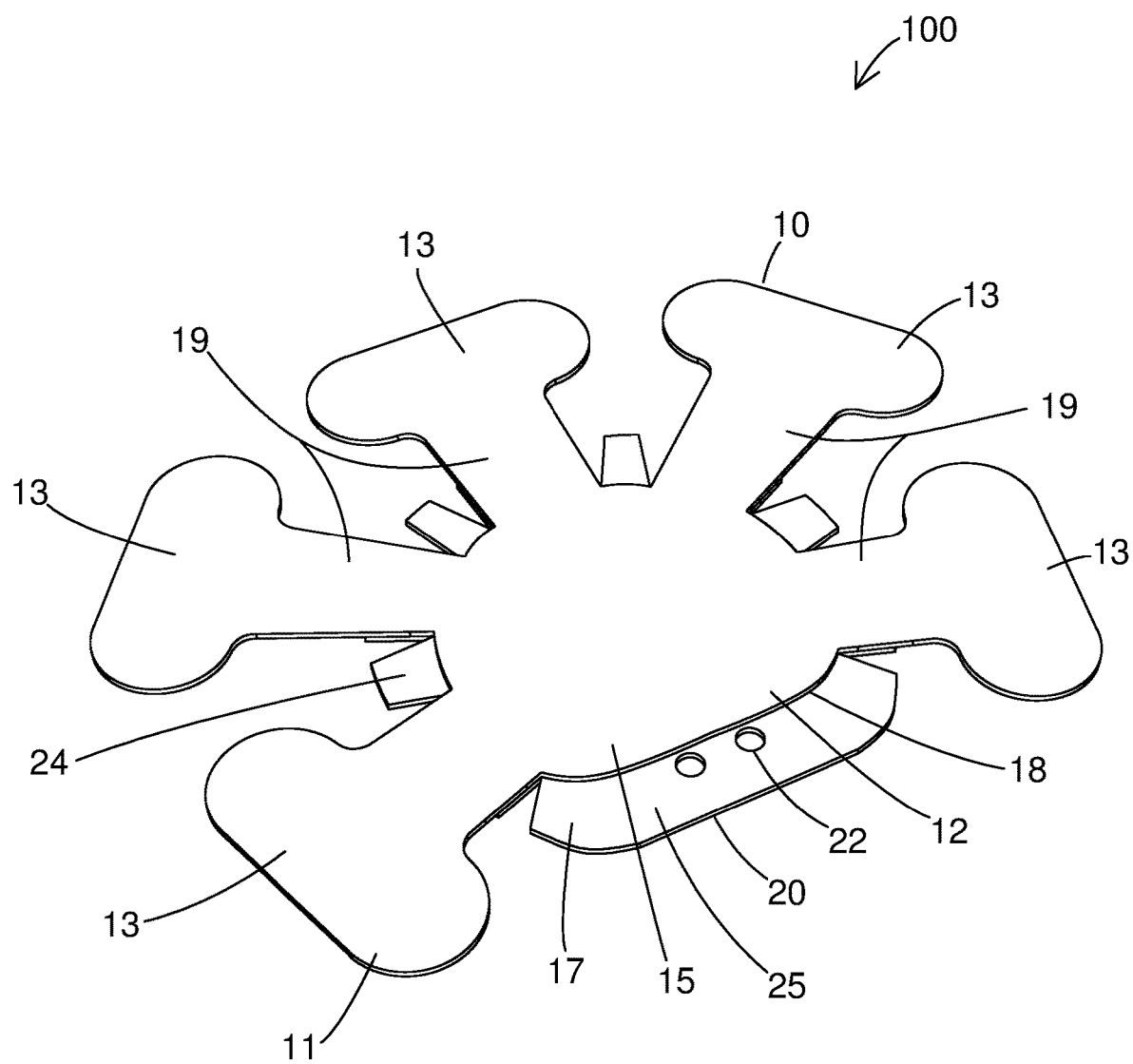
FIG. 2 is a perspective view of the exemplary hoof care pad shown in FIG. 1 as viewed from a bottom, front, left-hand side of the hoof care pad.

Embodiment 3. The hoof care kit 100 of embodiment 1 or 2, wherein said void-containing layer 17 has an overall size and shape so as to extend beyond an outer periphery 18 of said central backing layer portion 12 between at least two of said three or more backing layer extension portions 13. As shown in FIGS. 1-2, in exemplary hoof care pad 10, said void-containing layer 17 has an overall size and shape so as to extend beyond an outer periphery 18 of said central backing layer portion 12 between all of said three or more backing layer extension portions 13.

Embodiment 4. The hoof care kit 10 of any one of embodiments 1 to 3, wherein said void-containing layer 17 has an overall size and shape so as to extend beyond an outer periphery 18 of said central backing layer portion 12 between any two backing layer extension portions 13 of said three or more backing layer extension portions 13.

Embodiment 5. The hoof care kit 100 of any one of embodiments 1 to 4, wherein said void-containing layer 17 has an overall size and shape so as to extend beyond an outer periphery 18 of said central backing layer portion 12 and along a proximal portion 19 of each of said three or more backing layer extension portions 13. See, for example, FIG. 2.

Embodiment 6. The hoof care kit 100 of any one of embodiments 1 to 5, wherein said void-containing layer 17 has an overall size and shape so as to extend beyond an outer periphery 18 of said central backing layer portion 12 and said void-containing layer 17 has an outer perimeter 20 with slits (not shown), cut-outs 21, or both slits (not shown) and cut-outs 21 each independently extending from said outer perimeter 20 of said void-containing layer 17 towards said central backing layer portion 12. See, for example, FIGS. 1-2.

Embodiment 7. The hoof care kit 100 of embodiment 6, wherein one or more of said slits (not shown), said cut-outs 21, or both said slits (not shown) and said cut-outs 21 extends from said outer perimeter 20 of said void-containing layer 17 to said outer periphery 18 of said central backing layer portion 12. See, for example, FIG. 2.

Embodiment 8. The hoof care kit 100 of embodiment 6 or 7, wherein said void-containing layer 17 comprises two cut-outs 21 positioned between each of said three or more backing layer extension portions 13.

Embodiment 9. The hoof care kit 100 of any one of embodiments 1 to 8, wherein said void-containing layer 17 comprises two or more holes 22 extending through said void-containing layer 17 from an upper void-containing layer surface 23 of said void-containing layer 17 to a lower void-containing layer surface 24 of said void-containing layer 17.

Embodiment 10. The hoof care kit 100 of embodiment 9, wherein said two or more holes 22 extend through an outer periphery portion 25 of said void-containing layer 17 that extends beyond said outer periphery 18 of said central backing layer portion 12. See, for example, FIG. 2.

Embodiment 11. The hoof care kit 100 of embodiment 9 or 10, wherein said two or more holes 22 extend through a center portion 26 of said void-containing layer 17 so as to extend from said upper void-containing layer surface 23 of said void-containing layer 17 to said upper backing layer surface 14 within said central backing layer portion 12.

Embodiment 12. The hoof care kit 100 of any one of embodiments 9 to 11, wherein said two or more holes 22 comprise from about 12 to 24 holes 22. It should be understood that any number of holes 22 may be used in the present invention.

Embodiment 13. The hoof care kit 100 of any one of embodiments 1 to 12, wherein said void-containing layer 17 comprises a fiber-containing layer. It should be understood that although void-containing layer 17 is shown as being a single layer, void-containing layer 17 could be two or more void-containing layers combined to form void-containing layer 17.

Embodiment 14. The hoof care kit 100 of any one of embodiments 1 to 13, wherein said void-containing layer 17 comprises a nonwoven fabric layer.

Embodiment 15. The hoof care kit 100 of any one of embodiments 1 to 14, wherein said void-containing layer 17 comprises a felt layer.

Embodiment 16. The hoof care kit 100 of any one of embodiments 13 to 15, wherein said fiber-containing layer has a basis weight of from about 100 grams per square meter (gsm) to about 3000 gsm (or any value between 100 gsm and 3000 gsm, in increments of 0.1 gsm, e.g., 1000.0 gsm, or any range of values between 100 gsm and 3000 gsm, in increments of 0.1 gsm, e.g., from about 750.5 gsm to about 1153.8 gsm).

Embodiment 17. The hoof care kit 100 of any one of embodiments 13 to 16, wherein said fiber-containing layer has a basis weight of from about 800 gsm to about 1200 gsm (or any value between 800 gsm and 1200 gsm, in increments of 0.1 gsm, e.g., 1000.0 gsm, or any range of values between 800 gsm and 1200 gsm, in increments of 0.1 gsm, e.g., from about 950.6 gsm to about 1050.8 gsm).

Embodiment 18. The hoof care kit 100 of any one of embodiments 13 to 17, wherein said fiber-containing layer has a layer thickness of from about 1.0 millimeter (mm) to about 10.0 mm (or any value between 1.0 mm and 10.0 mm, in increments of 0.1 mm, e.g., 5.0 mm, or any range of values between 1.0 mm and 10.0 mm, in increments of 0.1 mm, e.g., from about 4.5 mm to about 5.5 mm).

Embodiment 19. The hoof care kit 100 of any one of embodiments 13 to 18, wherein said fiber-containing layer has a layer thickness of from about 4.5 mm to about 5.5 mm.

Embodiment 20. The hoof care kit 100 of any one of embodiments 13 to 19, wherein said fiber-containing layer comprises polyester, polypropylene, or both polyester and polypropylene.

Embodiment 21. The hoof care kit 100 of any one of embodiments 1 to 20, wherein said void-containing layer 17 is attached to said backing layer 11.

Embodiment 22. The hoof care kit 100 of any one of embodiments 1 to 21, wherein said void-containing layer 17 is attached to said central backing layer portion 12.

Embodiment 23. The hoof care kit 100 of any one of embodiments 1 to 22, wherein said void-containing layer 17 is attached to a proximal end extension portion 19 of each of said three or more backing layer extension portions 13.

Embodiment 24. The hoof care kit 100 of any one of embodiments 1 to 23, wherein said three or more backing layer extension portions 13 comprises from about four backing layer extension portions 13 to about ten backing layer extension portions 13.

Embodiment 25. The hoof care kit 100 of any one of embodiments 1 to 25, wherein said three or more backing layer extension portions 13 comprises five backing layer extension portions 13.

Figure 3:
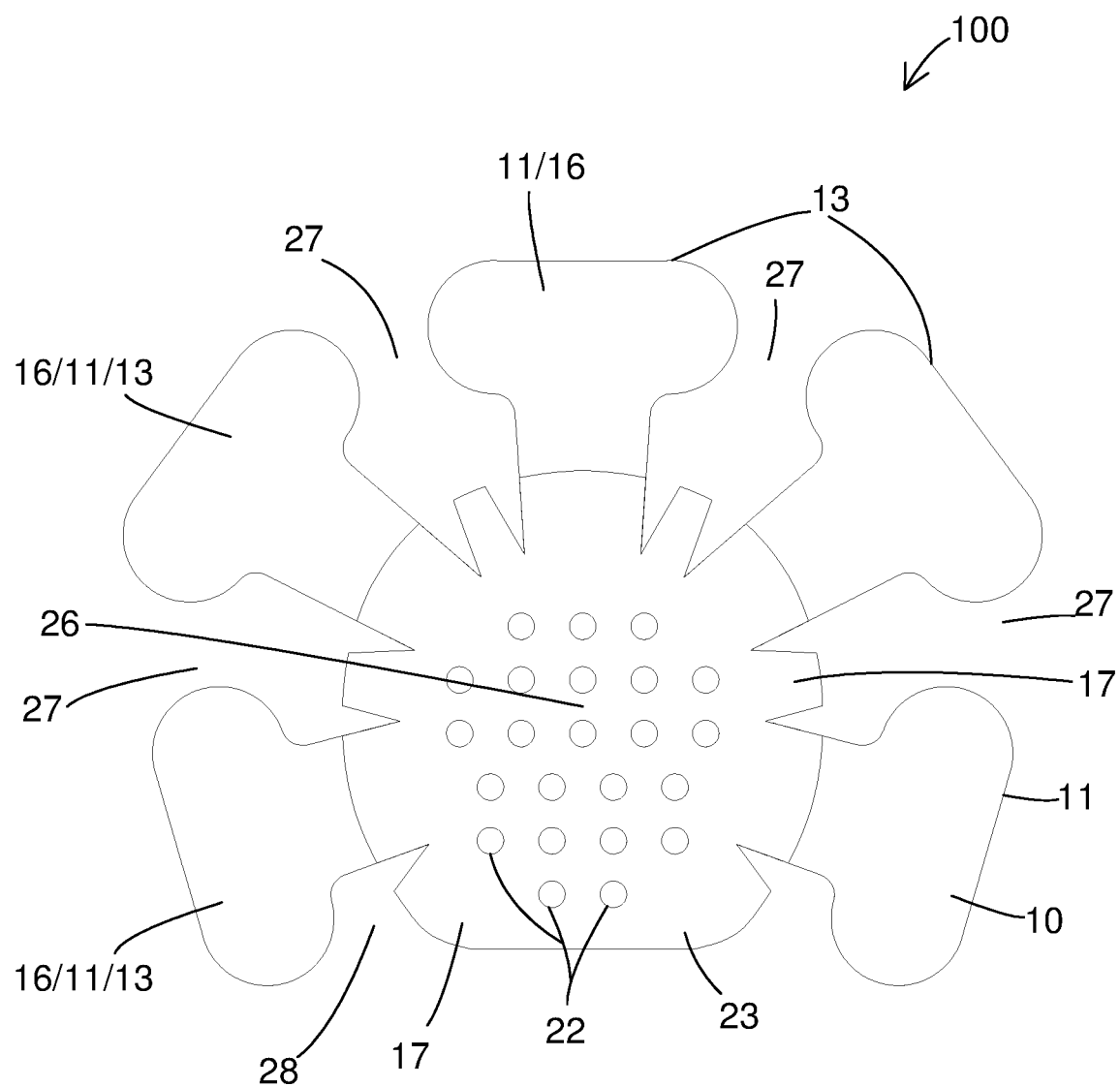
FIG. 3 is a top view of the exemplary hoof care pad shown in FIG. 1.

Embodiment 26. The hoof care kit 100 of embodiment 25, wherein said five backing layer extension portions 13 are spaced along said central backing layer portion 12 so as to form four substantially equal areas of space 27 between said five backing layer extension portions 13 and one larger area of space 28 between two of said five backing layer extension portions 13. See, for example, FIG. 3.

Figure 4:
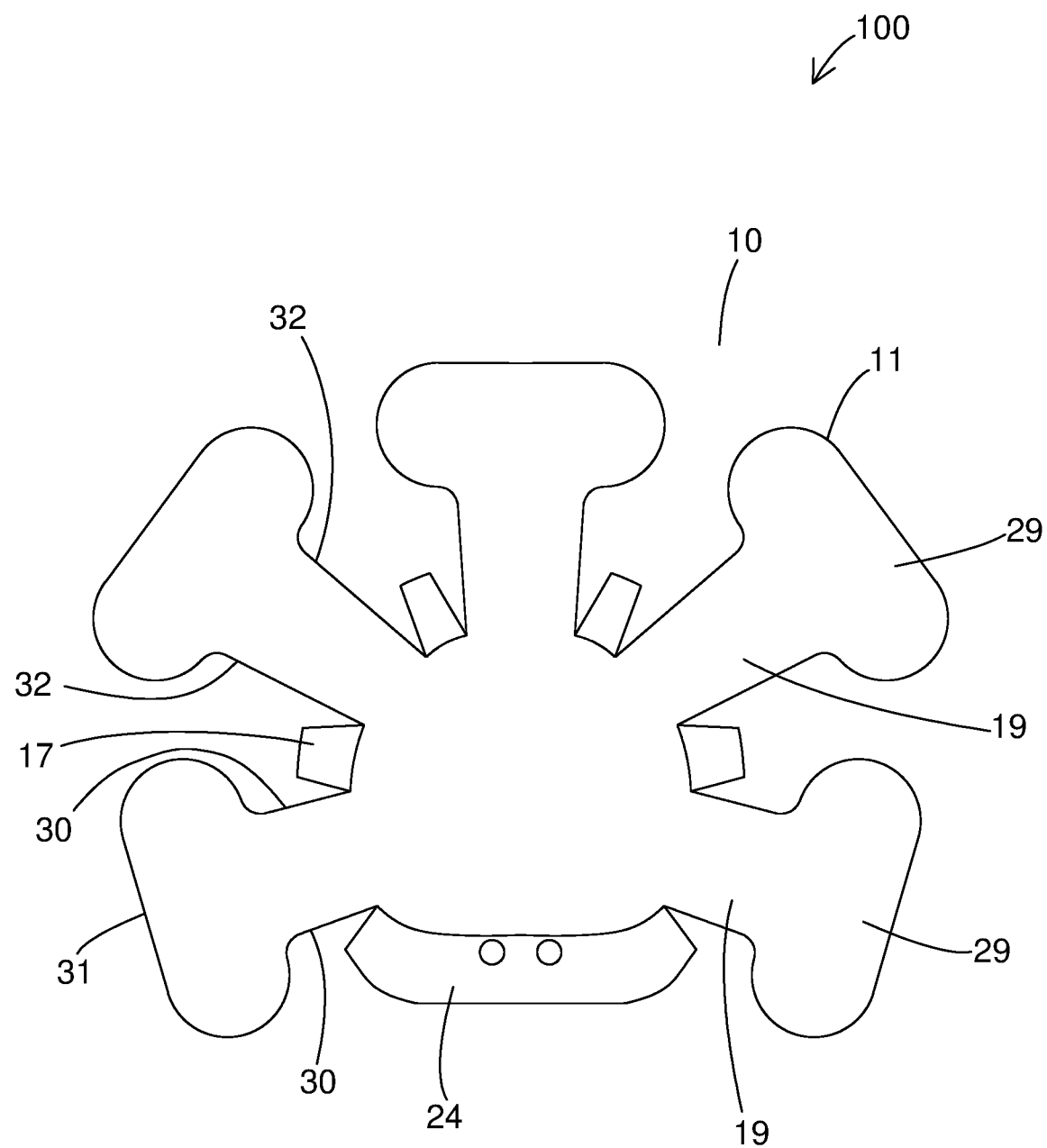
FIG. 4 is a bottom view of the exemplary hoof care pad shown in FIG. 3.
Figure 5:
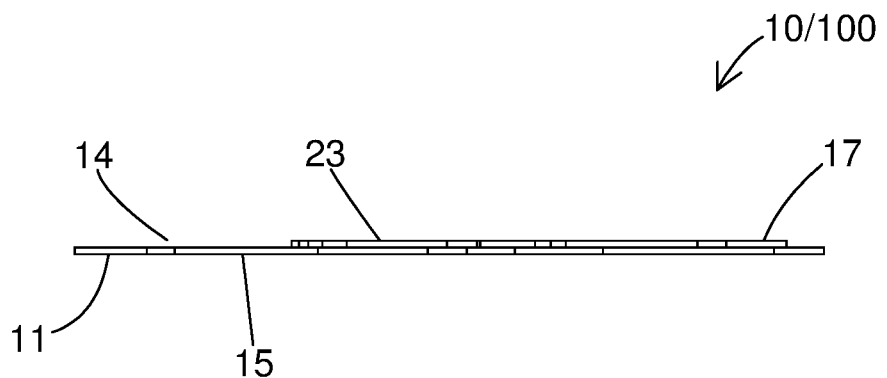
FIG. 5 is a left-side view of the exemplary hoof care pad shown in FIG. 3.
Figure 6:
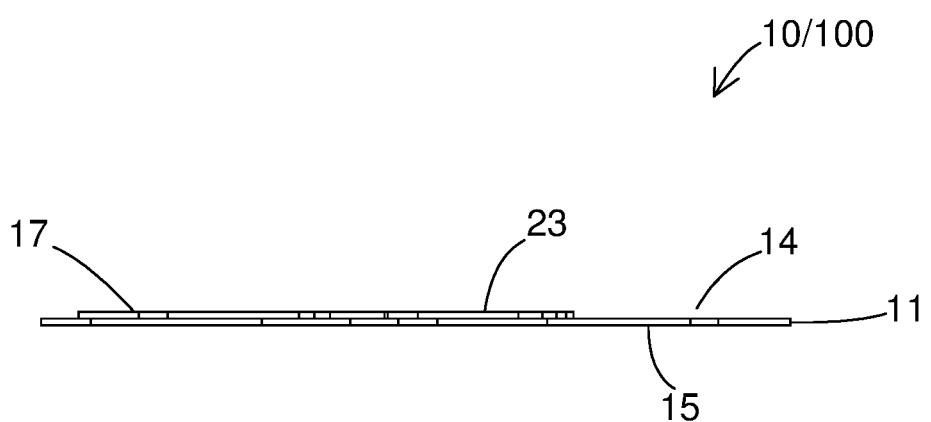
FIG. 6 is a right-side view of the exemplary hoof care pad shown in FIG. 3.
Figure 7:
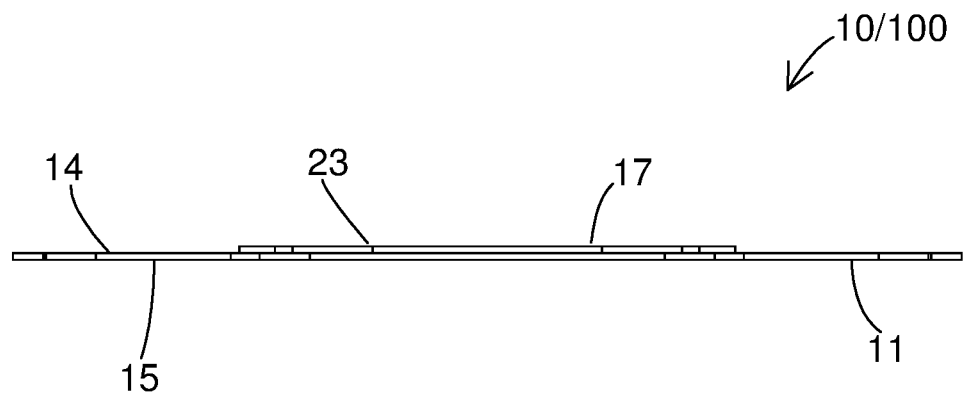
FIG. 7 is a frontal side view of the exemplary hoof care pad shown in FIG. 3.
Figure 8:
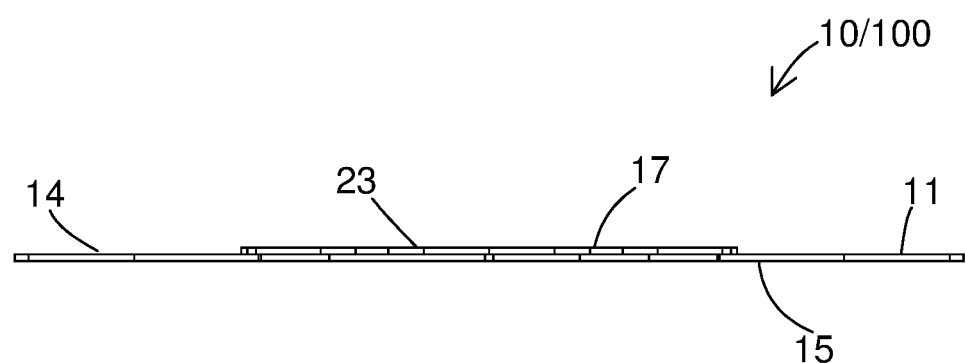
FIG. 8 is a rear side view of the exemplary hoof care pad shown in FIG. 3.
Figure 9:
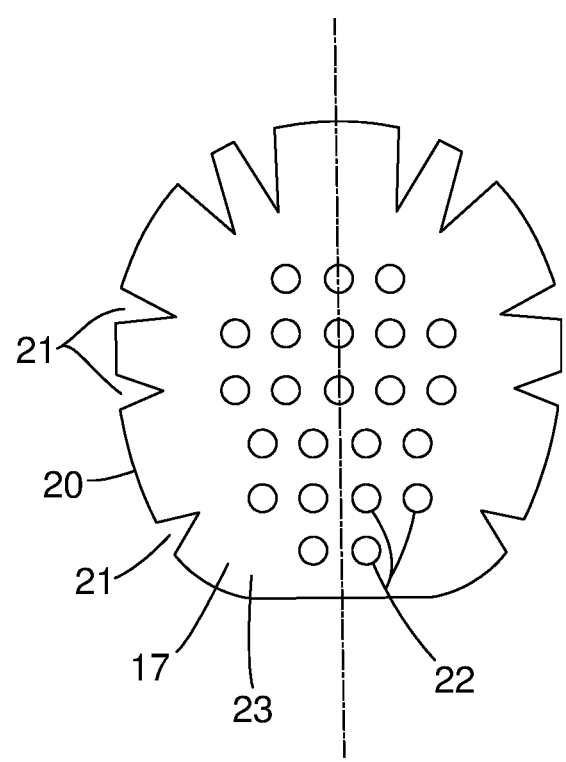
FIG. 9 is a top view of an exemplary void-containing layer suitable for use in the exemplary hoof care pad shown in FIG. 1.

Embodiment 27. The hoof care kit 100 of any one of embodiments 1 to 26, wherein each of said three or more backing layer extension portions 13 has a proximal end extension portion 19 and a distal end extension portion 29, said distal end extension portion 29 having a distal end width that is greater than a proximal end width of said proximal end extension portion 19. See, for example, FIG. 4.

Embodiment 28. The hoof care kit 100 of any one of embodiments 1 to 27, wherein each of said three or more backing layer extension portions 13 has a proximal end extension portion 19 and a distal end extension portion 29, and at least one of said three or more backing layer extension portions 13 has two substantially parallel side lines 30 extending between said proximal end extension portion 19 and said distal end extension portion 29.

Embodiment 29. The hoof care kit 100 of embodiment 28, wherein each of said at least one of said three or more backing layer extension portions 13 has a distal end edge 31 forming a straight distal end line 31, said distal end line 31 being substantially normal to said two substantially parallel side lines 30 extending between said proximal end extension portion 19 and said distal end extension portion 29.

Embodiment 30. The hoof care kit 100 of any one of embodiments 1 to 29, wherein each of said three or more backing layer extension portions 13 has a proximal end extension portion 19 and a distal end extension portion 29, and at least one of said three or more backing layer extension portions 13 has two opposing straight side lines 32 extending between said proximal end extension portion 19 and said distal end extension portion 29, said two opposing straight side lines 32 extending between said proximal end extension portion 19 and said distal end extension portion 29 being divergent relative to one another.

Embodiment 31. The hoof care kit 100 of any one of embodiments 1 to 30, wherein said backing layer 11 comprises a permeable layer 11.

Embodiment 32. The hoof care kit 100 of any one of embodiments 1 to 30, wherein said backing layer 11 comprises an impermeable layer 11.

Embodiment 33. The hoof care kit 100 of any one of embodiments 1 to 32, wherein said backing layer 11 comprises one or more fiber reinforcements therein (not shown). For example, a scrim, sheet of unidirectional fibers, a nonwoven, a woven fabric, or any combination could be positioned within or along backing layer 11.

Embodiment 34. The hoof care kit 100 of any one of embodiments 1 to 33, wherein said backing layer 11 comprises a polymeric material.

Embodiment 35. The hoof care kit 100 of any one of embodiments 1 to 34, wherein said backing layer 11 has a basis weight of from about 10 gsm to about 3000 gsm (or any value between 10 gsm and 3000 gsm, in increments of 0.1 gsm, e.g., 100.5 gsm, or any range of values between 10 gsm and 3000 gsm, in increments of 0.1 gsm, e.g., from about 75.5 gsm to about 953.8 gsm).

Embodiment 36. The hoof care kit 100 of any one of embodiments 1 to 35, wherein said backing layer 11 has a layer thickness of from about 1.0 mm to about 10.0 mm (or any value between 1.0 mm and 10.0 mm, in increments of 0.1 mm, e.g., 5.0 mm, or any range of values between 1.0 mm and 10.0 mm, in increments of 0.1 mm, e.g., from about 4.5 mm to about 5.5 mm).

Embodiment 37. The hoof care kit 100 of any one of embodiments 1 to 36, wherein said adhesive 16 is positioned along at least a portion of each of said three or more backing layer extension portions 13.

Embodiment 38. The hoof care kit 100 of any one of embodiments 1 to 37, wherein said adhesive 16 is positioned along a distal end extension portion 29 of each of said three or more backing layer extension portions 13.

Embodiment 39. The hoof care kit 100 of any one of embodiments 1 to 38, wherein said adhesive 16 is positioned along said central backing layer portion 12.

Embodiment 40. The hoof care kit 100 of any one of embodiments 1 to 39, wherein said adhesive 16 is positioned along all of said upper backing layer surface 14.

Embodiment 41. The hoof care kit 100 of any one of embodiments 1 to 40, wherein said adhesive 16 is a pressure sensitive adhesive 16.

Embodiment 42. The hoof care kit 100 of any one of embodiments 1 to 41, wherein said void-containing layer 17 has an overall width of from about 50 mm to about 250 mm (or any value between 50 mm and 250 mm, in increments of 0.1 mm, e.g., 140.0 mm, or any range of values between 50 mm and 250 mm, in increments of 0.1 mm, e.g., from about 135.5 mm to about 153.8 mm), and an overall length of from about 50 mm to about 250 mm (or any value between 50 mm and 250 mm, in increments of 0.1 mm, e.g., 142.0 mm, or any range of values between 50 mm and 250 mm, in increments of 0.1 mm, e.g., from about 137.5 mm to about 155.8 mm).

Embodiment 43. The hoof care kit 100 of any one of embodiments 1 to 42, wherein said backing layer 11 has an overall width of from about 75 mm to about 600 mm (or any value between 75 mm and 600 mm, in increments of 0.1 mm, e.g., 280.5 mm, or any range of values between 75 mm and 600 mm, in increments of 0.1 mm, e.g., from about 260.5 mm to about 320.5 mm), and an overall length of from about 50 mm to about 250 mm (or any value between 50 mm and 250 mm, in increments of 0.1 mm, e.g., 180.5 mm, or any range of values between 50 mm and 250 mm, in increments of 0.1 mm, e.g., from about 60.5 mm to about 220.5 mm).

Figure 10:
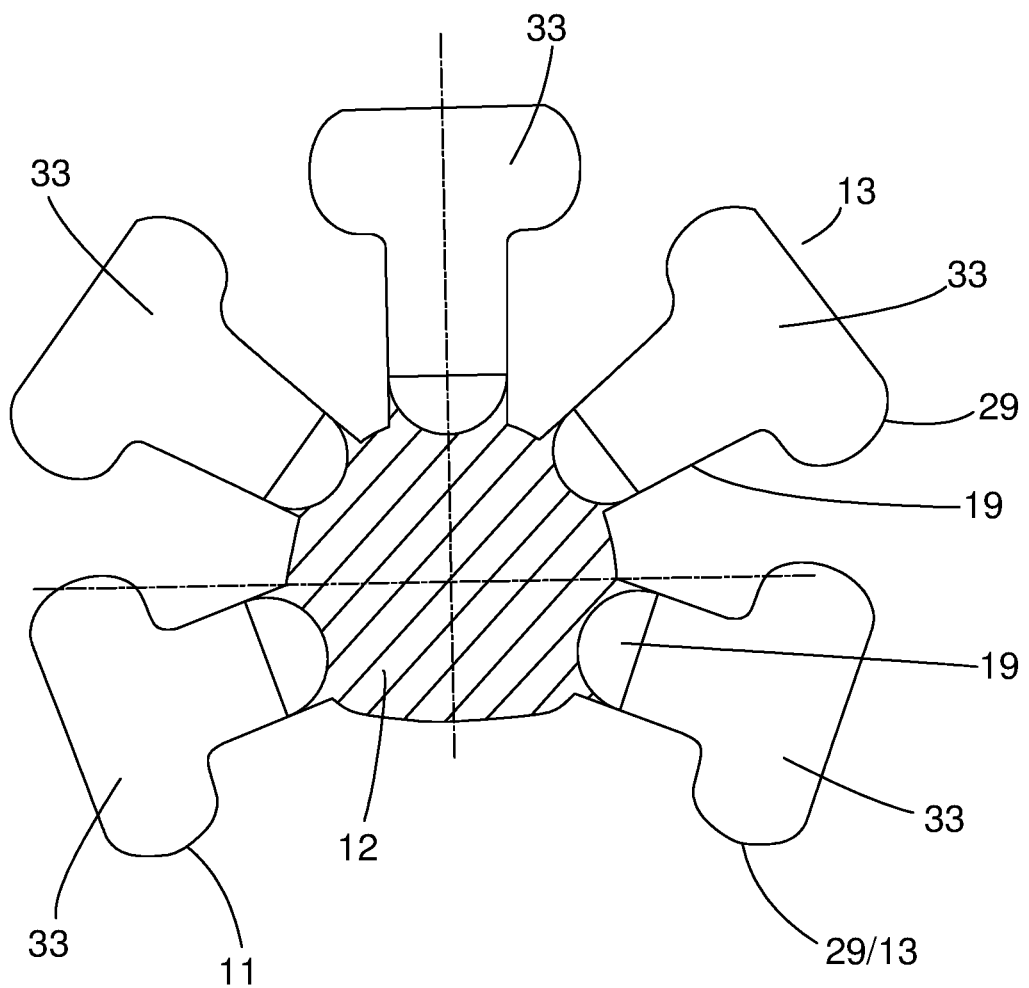
FIG. 10 is a top view of an exemplary backing layer suitable for use in the exemplary hoof care pad shown in FIG. 1.
Figure 11:
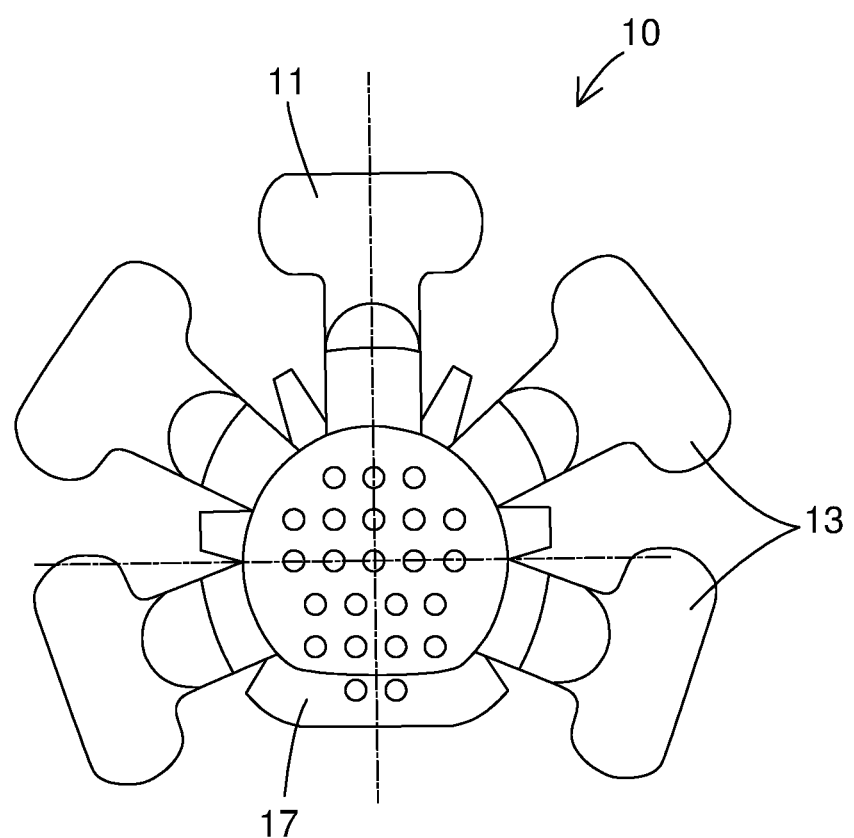
FIG. 11 is a top view of the exemplary void-containing layer shown in FIG. 9 positioned over and on the backing layer shown in FIG. 10 so as to form an exemplary hoof care pad of the present invention.
Figure 12:
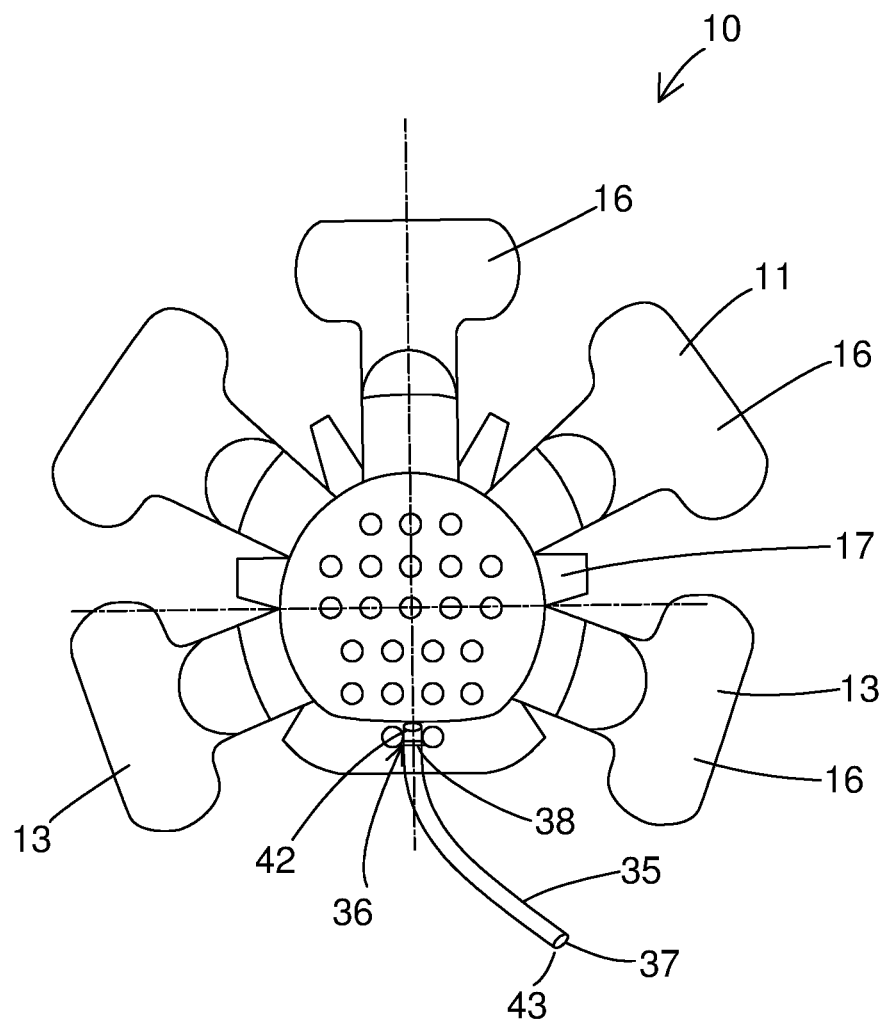
FIG. 12 is a top view of the exemplary hoof care pad shown in FIG. 11 with an exemplary length of tubing extending from the exemplary hoof care pad.
Figure 13:
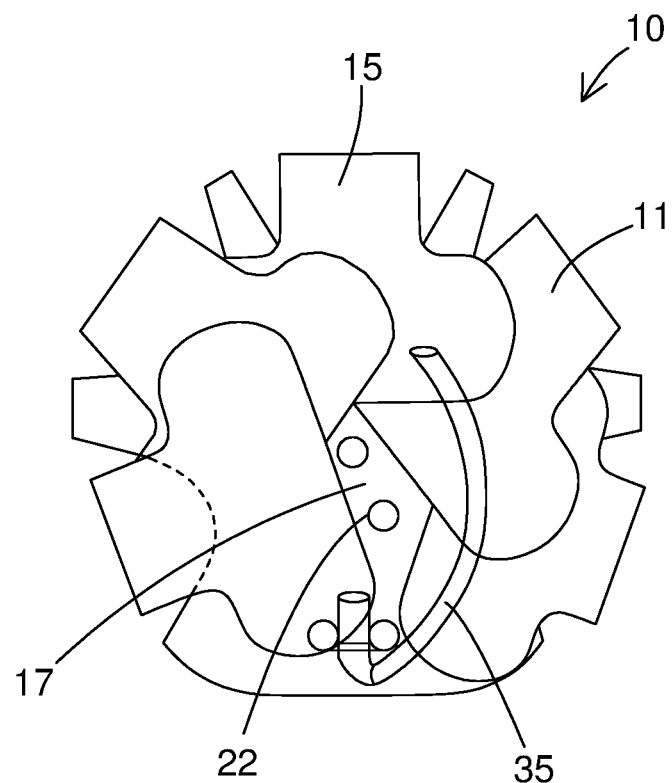
FIG. 13 is a top view of the exemplary hoof care pad assembly shown in FIG. 12 with extension portions of the exemplary hoof care pad folded over onto the central backing layer portion of the hoof care pad.
Figure 14:
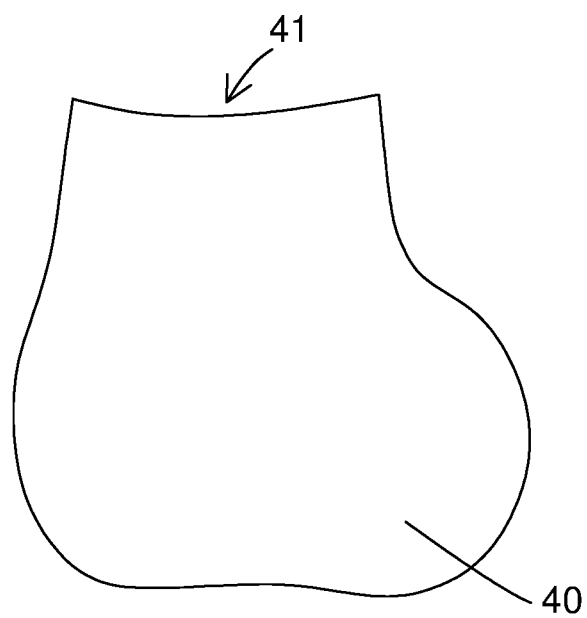
FIG. 14 is a perspective view of an exemplary boot suitable for use in the hoof care kits of the present invention.
Figure 15:
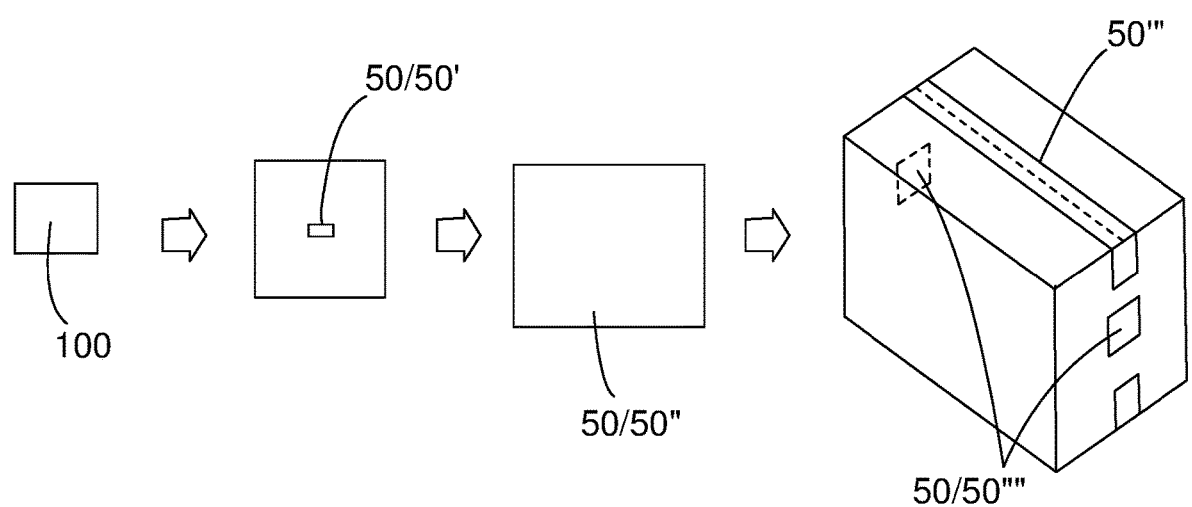
FIG. 15 is a perspective view of exemplary packaging suitable for packaging hoof care kits of the present invention.

Embodiment 44. The hoof care kit 100 of any one of embodiments 1 to 43, further comprising at least one release liner 33 sized to cover any exposable portions of said adhesive 16. As shown in FIG. 10, in some embodiments, five or more release liners 33 may be used to cover exposable portions of adhesive 16. In other embodiments, not shown, a single release liner 33 may be used instead of two or more release liners 33. For example, a single release liner 33 having dimensions 25.4 centimeters (cm)×30.0 cm may be used.

Embodiment 45. The hoof care kit 100 of any one of embodiments 1 to 44, further comprising at least one release liner 33 for each of said three or more backing layer extension portions 13.

Embodiment 46. The hoof care kit 100 of any one of embodiments 1 to 45, further comprising at least one release liner 33 for each of said three or more backing layer extension portions 13, each release liner 33 being sized to cover a distal end extending portion 29 of a given backing layer extension portion 13.

Embodiment 47. The hoof care kit 100 of any one of embodiments 1 to 46, further comprising a length of tubing 35, said length of tubing 35 being sized so as to (i) extend from said void-containing layer 17 of said hoof care pad 10 to a point beyond an outer periphery 18 of said backing layer 11, and (ii) have an inner diameter that enables a fluid to travel through said length of tubing 35 from a first tube opening 36 to a second tube opening 37 at opposite ends of said length of tubing 35.

Embodiment 48. The hoof care kit 100 of embodiment 47, wherein said length of tubing 35 has an overall length of from about 75 mm to about 600 mm (or any value between 75 mm and 600 mm, in increments of 0.1 mm, e.g., 280.5 mm, or any range of values between 75 mm and 600 mm, in increments of 0.1 mm, e.g., from about 260.5 mm to about 320.5 mm), an inner diameter of from about 3.0 mm to about 12.0 mm (or any value between 3.0 mm and 12.0 mm, in increments of 0.01 mm, e.g., 6.30 mm, or any range of values between 3.0 mm and 12.0 mm, in increments of 0.01 mm, e.g., from about 6.00 mm to about 6.60 mm), and an outer diameter of from about 4.0 mm to about 15.0 mm (or any value between 4.0 mm and 15.0 mm, in increments of 0.01 mm, e.g., 9.30 mm, or any range of values between 4.0 mm and 15.0 mm, in increments of 0.01 mm, e.g., from about 9.00 mm to about 9.60 mm).

Embodiment 49. The hoof care kit 100 of embodiment 47 or 48, wherein said length of tubing 35 is transparent.

Embodiment 50. The hoof care kit 100 of any one of embodiments 47 to 49, wherein said length of tubing 35 comprises polyvinyl chloride (PVC) tubing 35.

Embodiment 51. The hoof care kit 100 of any one of embodiments 47 to 50, further comprising a tube fastener 38 sized to attach said length of tubing 35 to said hoof care pad 10.

Embodiment 52. The hoof care kit 100 of embodiment 51, wherein said tube fastener 38 comprises a length of tie fastener 38.

Embodiment 53. The hoof care kit 100 of any one of embodiments 1 to 52, further comprising a boot 40 sized to accept and store a hoof and lower leg portion of an animal (not shown).

Embodiment 54. The hoof care kit 100 of embodiment 53, wherein said boot 40 comprises a rubber boot 40.

Embodiment 55. The hoof care kit 100 of embodiment 53 or 54, wherein said boot 40 further comprises a boot fastener (not shown) designed to secure said boot 40 onto a leg of an animal (not shown).

Embodiment 56. The hoof care kit 100 of embodiment 55, wherein said boot fastener (not shown) is separate from and attachable to said boot 40. For example, the boot fastener may be a strap, piece of rope, hook and loop material, etc.

Embodiment 57. The hoof care kit 100 of embodiment 55, wherein said boot fastener (not shown) is integrally attached to said boot 40 proximate an open end 41 of said boot 40. For example, the boot fastener may be a strap with hook and loop material thereon that is integrally attached to boot 40 along open end 41 of boot 40.

Embodiment 58. The hoof care kit 100 of any one of embodiments 53 to 57, wherein said length of tubing 35 extends from said void-containing layer 17 of said hoof care pad 10 to a point beyond an open end 41 of said boot 40.

Embodiment 59. The hoof care kit 100 of any one of embodiments 1 to 58, further comprising a liquid composition (not shown) within said void-containing layer 17, said liquid composition comprising one or more medications for treating an animal hoof or a wound on an animal hoof (not shown). It should be understood that any liquid composition that provides a benefit to an animal's hoof may be used in the present hoof care kit. The liquid composition may be sold separately or as a kit component (e.g., a container or jar or bottle with the liquid composition therein). In some embodiments, the liquid composition comprises a liquid composition as described in International Patent Application Serial No. PCT/US17/54238, filed on Sep. 29, 2017, and entitled "Compositions and Methods of Making and Using the Same," the subject matter of which is incorporated herein in its entirety.

Embodiment 60. The hoof care kit 100 of any one of embodiments 1 to 59, wherein said hoof care pad 10 is attached to a hoof of an animal (not shown).

Embodiment 61. The hoof care kit 100 of embodiment 60, wherein said boot 40 is positioned over said hoof care pad 10, and said length of tubing 35 extends from said hoof care pad 10 to a position outside said boot 40.

Embodiment 62. The hoof care kit 100 of any one of embodiments 1 to 61, wherein the animal comprises a horse, a cow, or any other livestock animal.

Embodiment 63. The hoof care kit 100 of any one of embodiments 1 to 62, further comprising one or more pieces of packaging 50 sized to package one or more units of said hoof care kit 100.

Embodiment 64. The hoof care kit 100 of embodiment 63, wherein said one or more pieces of packaging 50 are sized to package from two to 100 units of said hoof care kit 100 (or any number of units between 2 and 100, in increments of 1, e.g., 50 units, or any range of number of units between 2 and 100, in increments of 1, e.g., from 50 to 75 units).

Embodiment 65. The hoof care kit 100 of embodiment 63 or 64, wherein said one or more pieces of packaging 50 comprise (i) one or more plastic bags 50', (ii) one or more paper or cardboard boxes 50", (iii) one or more pieces of tape 50''', and (iv) one or more labels 50''''.

Methods of Making Hoof Care Kits

Embodiment 66. A method of making the hoof care kit 100 of any one of embodiments 1 to 65, said method comprising: forming the void-containing layer 17; forming the base layer 11; and positioning the adhesive 16 along the upper backing layer surface 14 of the backing layer 11.

Embodiment 67. The method of embodiment 66, wherein said forming the void-containing layer 17 step comprises one or more of the following steps: forming a nonwoven fabric layer (not shown); and cutting the void-containing layer 17 from the nonwoven fabric layer.

Embodiment 68. The method of embodiment 67, wherein said forming the void-containing layer 17 step further comprises forming one or more holes 22 that extend through the void-containing layer 17.

Embodiment 69. The method of any one of embodiments 66 to 68, wherein said forming the base layer 11 step comprises one or more of the following steps: forming a sheet of base layer material; and cutting the base layer 11 from the sheet of base layer material.

Embodiment 70. The method of any one of embodiments 66 to 69, further comprising: attaching the void-containing layer 17 to the base layer 11.

Embodiment 71. The method of any one of embodiments 66 to 70, further comprising: attaching one or more pieces of release liner 33 so as to cover any exposed surfaces of the adhesive 16.

Embodiment 72. The method of any one of embodiments 66 to 71, further comprising: assembling the length of tubing 35 with the hoof care pad 10.

Embodiment 73. The method of any one of embodiments 66 to 72, further comprising: assembling the tube fastener 38 with the hoof care pad 10.

Embodiment 74. The method of any one of embodiments 66 to 73, further comprising: assembling the boot 40 with the hoof care pad 10.

Embodiment 75. The method of any one of embodiments 66 to 74, further comprising: positioning each of the hoof care kit components 10/35/40 within the one or more pieces of packaging 50.

Methods of Using Hoof Care Kits

Embodiment 76. A method of using the hoof care kit 100 of any one of embodiments 1 to 65, said method comprising: positioning the hoof care pad 10 along a hoof of an animal (not shown) with the void-containing layer 17 next to the hoof.

Embodiment 77. The method of embodiment 76, further comprising: attaching distal end extension portions 29 of each of the three or more backing layer extension portions 13 to side surfaces of the hoof (not shown).

Embodiment 78. The method of embodiment 77, further comprising: removing one or more pieces of release liner 33 to uncover one or more exposed surfaces of the adhesive 16 prior to said attaching step.

Embodiment 79. The method of any one of embodiments 76 to 78, further comprising: fixing a first end 42 of a length of tubing 35 to the hoof care pad 10 proximate or along the void-containing layer 17 of the hoof care pad 10.

Embodiment 80. The method of any one of embodiments 76 to 79, further comprising: positioning a boot 40 over the hoof and lower leg of the animal (not shown) so as to encapsulate the hoof care pad 10 attached to the hoof of the animal.

Embodiment 81. The method of any one of embodiments 76 to 80, further comprising: introducing a liquid composition (not shown) into or onto the void-containing layer 17 of the hoof care pad 10.

Embodiment 82. The method of embodiment 81, wherein the liquid composition comprises one or more medications for treating a hoof of an animal or a wound proximate or on the hoof of an animal.

Embodiment 83. The method of embodiment 81 or 82, wherein said introducing step comprises feeding the liquid composition through a second end 43 of the length of tubing 35, the second end 43 being opposite the first end 42, the second end 43 of the length of tubing 35 being outside an open end 41 of the boot 40.

Embodiment 84. The method of any one of embodiments 80 to 83, further comprising: removing the boot 40 so as to expose the hoof care pad 10 attached to the hoof and lower leg of the animal (not shown).

Embodiment 85. The method of any one of embodiments 76 to 84, further comprising: removing the hoof care pad 10 from the hoof and lower leg of the animal (not shown).

Embodiment 86. The method of any one of embodiments 76 to 85, wherein the animal comprises a horse, a cow, or any other livestock animal.

It should be understood that although the above-described hoof care kits, kit components and methods are described as "comprising" one or more features, components or steps, the above-described hoof care kits, kit components and methods may "comprise," "consists of," or "consist essentially of" any of the above-described features, components or steps of the hoof care kits, kit components and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a hoof care kit, kit component and/or method that "comprises" a list of elements (e.g., components or steps) is not necessarily limited to only those elements (or components or steps), but may include other elements (or components or steps) not expressly listed or inherent to the hoof care kit, kit component and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a hoof care kit, kit component and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described hoof care kits, kit components and/or methods may comprise, consist essentially of, or consist of any of the herein-described components, features and steps, as shown in the figures with or without any feature(s) not shown in the figures. In other words, in some embodiments, the hoof care kits, kit components and/or methods of the present invention do not have any additional features other than those shown in the figures, and such additional features, not shown in the figures, are specifically excluded from the hoof care kits, kit components and/or methods. In other embodiments, the hoof care kits, kit components and/or methods of the present invention do have one or more additional features that are not shown in the figures.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Hoof care kits and kit components as described in embodiments 1 to 86 were prepared. The hoof care kits and kit components were used to treat wounds on animal hoofs for a variety of animals including horses, cattle, and other livestock.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A hoof care kit comprising:
a hoof care pad, said hoof care pad comprising:
a backing layer comprising (i) a central backing layer portion having a central backing layer portion outer periphery extending along an outer perimeter of said central backing layer portion, and (ii) three or more backing layer extension portions extending outward from said central backing layer portion beyond said central backing layer portion outer periphery, each backing layer extension portion having opposite side edges that originate at said central backing layer portion outer periphery, said backing layer further comprising an upper backing layer surface along said central backing layer portion and said three or more backing layer extension portions, and a lower backing layer surface opposite said upper backing layer surface;
an adhesive positioned along at least a portion of said upper backing layer surface, said adhesive being positioned along at least a distal end extension portion of each of said three or more backing layer extension portions; and
a void-containing layer positioned on and attached to at least a portion of said upper backing layer surface within said central backing layer portion, said void-containing layer (a) being capable of accepting and containing a liquid composition, (b) having an exposed upper void-containing layer surface, and a lower void-containing layer surface, and (c) having an overall size and shape so as to (i) extend beyond said central backing layer portion outer periphery and into a proximal end extension portion of each of said three or more backing layer extension portions, and (ii) extend beyond said central backing layer portion outer periphery and between two adjacent proximal end extension portions of said three or more backing layer extension portions so as to expose a portion of said lower void-containing layer surface, and (c) having an a void-containing layer outer perimeter with one or more cut-outs, each cut-out independently extending from said void-containing layer outer perimeter towards said central backing layer portion outer periphery,
wherein said void-containing layer (a) comprises a fiber-containing layer, and (b) comprises two or more holes extending through said void-containing layer from said exposed upper void-containing layer surface of said void-containing layer to said lower void-containing layer surface of said void-containing layer, said two or more holes extending (i) to said lower void-containing layer surface along said upper backing layer surface, and (ii) through said void-containing layer between said two adjacent proximal end extension portions of said three or more backing layer extension portions; and
wherein said hoof care pad is sized so as to cover a bottom surface of a hoof of an animal and extend along at least one side surface of the hoof.

2. The hoof care kit of claim 1, wherein one or more of said cut-outs extends from said void-containing layer outer perimeter to said central backing layer portion outer periphery.

3. The hoof care kit of claim 1, wherein said void-containing layer comprises two cut-outs positioned between each of said three or more backing layer extension portions.

4. The hoof care kit of claim 1, wherein said two or more holes comprise from about 12 to 24 holes.

5. The hoof care kit of claim 1, wherein said fiber-containing layer has a basis weight of from about 800 gsm to about 1200 gsm, and a layer thickness of from about 1.0 millimeter (mm) to about 10.0 mm.

6. The hoof care kit of claim 1, wherein said three or more backing layer extension portions comprises five backing layer extension portions.

7. The hoof care kit of claim 1, wherein each of said three or more backing layer extension portions has a proximal end extension portion and a distal end extension portion, and said opposite side edges of at least one of said three or more backing layer extension portions extend between said proximal end extension portion and said distal end extension portion, said opposite side edges extending between said proximal end extension portion and said distal end extension portion being divergent relative to one another.

8. The hoof care kit of claim 1, wherein said adhesive is a pressure sensitive adhesive, and said hoof care kit further comprises at least one release liner sized to cover any exposable portions of said adhesive.

9. The hoof care kit of claim 1, further comprising a length of tubing, said length of tubing being sized so as to (i) extend from said void-containing layer of said hoof care pad to a point beyond an outer periphery of said backing layer, and (ii) have an inner diameter that enables a fluid to travel through said length of tubing from a first tube opening to a second tube opening at opposite ends of said length of tubing.

10. The hoof care kit of claim 9, further comprising a boot sized to accept and store a hoof and lower leg portion of an animal, wherein said length of tubing extends from said void-containing layer of said hoof care pad to a point beyond an open end of said boot.

11. The hoof care kit of claim 1, further comprising said liquid composition within said void-containing layer, said liquid composition comprising one or more medications for treating an animal hoof or a wound on an animal hoof.

12. A method of using the hoof care kit of claim 1, said method comprising:
positioning the hoof care pad along a hoof of an animal with the void-containing layer next to the hoof; and
attaching distal end extension portions of each of the three or more backing layer extension portions to side surfaces of the hoof.

13. A hoof care kit comprising:
a hoof care pad, said hoof care pad comprising:
a backing layer comprising (i) a central backing layer portion having a central backing layer portion outer periphery extending along an outer perimeter of said central backing layer portion, and (ii) five backing layer extension portions extending outward from said central backing layer portion beyond said central backing layer portion outer periphery, each backing layer extension portion having opposite side edges that originate at said central backing layer portion outer periphery, said backing layer further comprising an upper backing layer surface along said central backing layer portion and said five backing layer extension portions, and a lower backing layer surface opposite said upper backing layer surface;
a pressure sensitive adhesive positioned along a distal end extension portion of each of said five backing layer extension portions; and
a void-containing layer positioned on and attached to at least a portion of said upper backing layer surface within said central backing layer portion, said void-containing layer being (i) capable of accepting and containing a liquid composition and (ii) attached to said central backing layer portion, said void-containing layer comprising (a) a felt layer and (b) two or more holes extending through said felt layer from an exposed upper void-containing layer surface of said felt layer to a lower void-containing layer surface of said felt layer along said upper backing layer surface, each of said two or more holes extending through a center portion of said felt layer so as to expose portions of said upper backing layer surface outlined by said two or more holes,
said felt layer (a) having an upper felt layer surface, and a lower felt layer surface, (b) having an overall size and shape so as to (i) extend beyond said central backing layer portion outer periphery, (ii) into a proximal end extension portion of each of said five backing layer extension portions, and (iii) between two adjacent proximal end extension portions of said five backing layer extension portions so as to expose a portion of said lower felt layer surface, and (c) have an having a felt layer outer perimeter with one or more cut-outs, each cut-out independently extending from said felt layer outer perimeter towards said central backing layer portion outer periphery; and
wherein said hoof care pad is sized so as to cover a bottom surface of a hoof of an animal and extend along at least one side surface of the hoof.

14. The hoof care kit of claim 13, wherein said two or more holes comprises from about 12 to 24 holes.

15. The hoof care kit of claim 13, further comprising (a) a length of tubing, said length of tubing being sized so as to (i) extend from said felt layer of said hoof care pad to a point beyond an outer periphery of said backing layer, and (ii) have an inner diameter that enables a fluid to travel through said length of tubing from a first tube opening to a second tube opening at opposite ends of said length of tubing, (b) a boot sized to accept and store a hoof and lower leg portion of an animal, wherein said length of tubing extends from said felt layer of said hoof care pad to a point beyond an open end of said boot, and (c) said liquid composition, said liquid composition comprising one or more medications for treating an animal hoof or a wound on an animal hoof.

16. The hoof care kit of claim 13, wherein said hoof care pad consists of (A) said backing layer, (B) said pressure sensitive adhesive; and (C) said void-containing layer.

17. A hoof care kit comprising:
(I) a hoof care pad, said hoof care pad comprising:
a backing layer comprising (i) a central backing layer portion having a central backing layer portion outer periphery extending along an outer perimeter of said central backing layer portion, and (ii) three or more backing layer extension portions extending outward from said central backing layer portion beyond said central backing layer portion outer periphery, each backing layer extension portion having opposite side edges that originate at said central backing layer portion outer periphery, said backing layer further comprises an upper backing layer surface along said central backing layer portion and said three or more backing layer extension portions, and a lower backing layer surface opposite said upper backing layer surface;
an adhesive positioned along a distal end extension portion of each of said three or more backing layer extension portions; and
a void-containing layer positioned on and attached to at least a portion of said upper backing layer surface within said central backing layer portion, said void-containing layer (a) being capable of accepting and containing a liquid, (b) having an exposed upper void-containing layer surface, and a lower void-containing layer surface, and (c) having an overall size and shape so as to (i) extend beyond said central backing layer portion outer periphery, (ii) into a proximal end extension portion of each of said three or more backing layer extension portions, and (iii) between two adjacent proximal end extension portions of said three or more backing layer extension portions so as to expose a portion of said lower void-containing layer surface, and (c) having a void-containing layer outer perimeter with one or more cut-outs, each cut-out independently extending from said void-containing layer outer perimeter towards said central backing layer portion outer periphery, and (d) having two or more holes extending through said void-containing layer from an exposed upper void-containing layer surface of said void-containing layer to a lower void-containing layer surface of said void-containing layer, each of said two or more holes extending through a center portion of said void-containing layer so as to extend from said exposed upper void-containing layer surface to said upper backing layer surface and expose portions of said upper backing layer surface outlined by said two or more holes,
wherein said hoof care pad is sized so as to cover a bottom surface of a hoof of an animal and extend along at least one side surface of the hoof;
(II) a length of tubing attached to said hoof care pad, said length of tubing being sized so as to (i) extend from said void-containing layer of said hoof care pad to a point beyond said backing layer, and (ii) have an inner diameter that enables a fluid to travel through said length of tubing from a first tube opening to a second tube opening at opposite ends of said length of tubing;
(III) a boot sized to accept and store a hoof and lower leg portion of an animal, wherein said length of tubing extends from said void-containing layer of said hoof care pad to a point beyond an open end of said boot, and
(IV) a liquid composition comprising one or more medications for treating an animal hoof or a wound on an animal hoof.

18. The hoof care kit of claim 17, wherein (a) said three to five backing layer extension portions comprise five backing layer extension portions, and (b) said two or more holes comprises from about 12 to 24 holes.

19. The hoof care kit of claim 17, wherein said hoof care kit consists of (I) said hoof care pad, said hoof care pad consisting of: (A) said backing layer; (B) said adhesive, and (C) said void-containing layer; (II) said length of tubing attached to said hoof care pad; (III) said boot; and (IV) said liquid composition.

20. The hoof care kit of claim 17, wherein said void-containing layer comprises a fiber-containing layer having a basis weight of from about 800 gsm to about 1200 gsm, and a layer thickness of from about 1.0 millimeter (mm) to about 10.0 mm.

* * * * *